No. 609,529. Patented Aug. 23, 1898.
J. N. WRIGHT.
MILK STRAINER.
(Application filed Sept. 14, 1897.)
(No Model.)

Witnesses
Wm. F. Doyle
Chas. E. Brock

Inventor
John N. Wright,
by
Attorneys

THE NORRIS PETERS CO., PHOTO-LITHO., WASHINGTON, D. C.

UNITED STATES PATENT OFFICE.

JOHN N. WRIGHT, OF LUVERNE, MINNESOTA.

MILK-STRAINER.

SPECIFICATION forming part of Letters Patent No. 609,529, dated August 23, 1898.

Application filed September 14, 1897. Serial No. 651,596. (No model.)

*To all whom it may concern:*

Be it known that I, JOHN N. WRIGHT, a citizen of the United States of America, residing at Luverne, in the county of Rock and State of Minnesota, have invented a new and useful Milk-Strainer, of which the following is a specification.

My invention is in the nature of a milk strainer and aerator, and has for its object to furnish for the use of farmers, dairymen, and others an improved means for straining milk and causing the same to be subjected to the action of the atmosphere, thus purifying it.

With this object in view my invention consists in an improved milk strainer and aerator comprising a bowl or funnel shaped receptacle into which the milk is poured, a pipe communicating with the bottom thereof, extending laterally and slightly downward therefrom, provided with fine perforations in its under side and a closed outer end, and a trough located below and in line with the lateral pipe and inclined downwardly in the opposite direction to receive the milk as it drips from the perforated pipe and conduct it into the can.

In order to enable others skilled in the art to which my invention most nearly appertains to make and use the same, I will now proceed to describe its construction and operation, reference being had to the accompanying drawings, in which—

Figure 1:
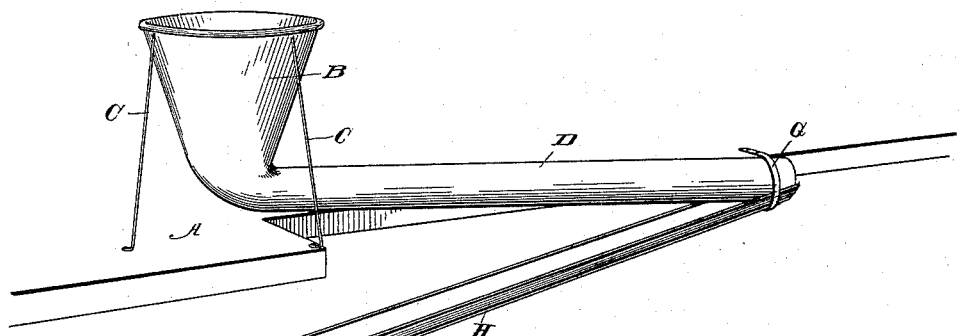
Figure 2:
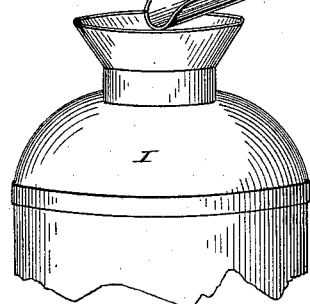
Figure 3:
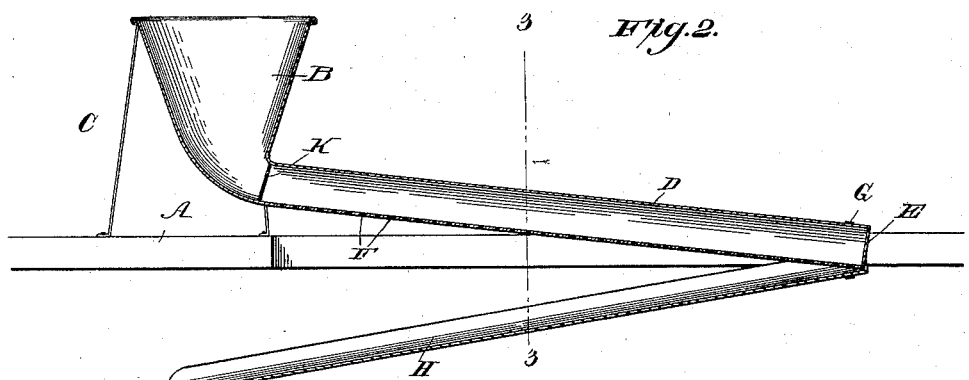
Figure 3:
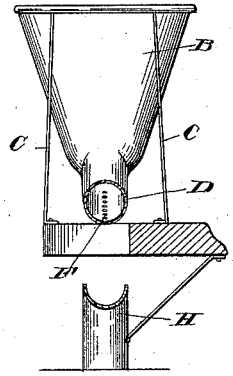

Figure 1 is a perspective view illustrating my invention in position for practical operation, the milk-can being shown partly broken away. Fig. 2 is a longitudinal vertical section through the strainer and aerator, the can being shown in side elevation with its upper and lower portions broken away. Fig. 3 is a transverse vertical section on the line 3 3 of Fig. 2, looking in the direction of the arrow.

Like letters of reference mark the same parts wherever they occur in the various figures of the drawings.

Referring to the drawings by letters, A is the table, shelf, or other support, to which the bowl B, of any suitable shape, preferably conical, as shown, may be attached by standards C or in any other desirable manner. The bowl B is open at the bottom and provided with a laterally-extending inclined pipe D, the outer end E of which is closed and the bottom of the pipe formed with a longitudinal series of small perforations F. Secured to the outer end of the pipe D in any suitable manner (a band G being shown for the purpose) is a reversely-inclined trough H, which lies below and directly in the vertical line of the lateral pipe D, as clearly shown in Figs. 2 and 3, which trough leads to a milk-can I or any other suitable receptacle. The pipe D at its upper end, at the bottom of the bowl B, is provided with a strainer or sieve K, which may be of any suitable material or form and secured therein in any approved manner.

In operating my invention the various parts of the device are assembled as shown and the milk poured into the top of the bowl B. From thence it will naturally flow into and toward the lower end of the pipe D, being strained by the sieve or strainer K as it enters the pipe. In flowing down through the pipe D the milk will drip in small particles through the perforations F and drop through the intervening atmosphere into the trough H, from whence it will flow downwardly in the reverse direction and be delivered into the can I or other receptacle.

The perforations F will be so graduated in size that substantially all of the milk admitted into the upper end of the pipe D will have passed through these perforations when the lower end of the pipe is reached by the advanced milk, so that there will be no tendency to overflow the bowl B by the milk damming up, as it were, in the pipe D.

In passing through the perforations F the milk will be divided into very small particles, and these particles dropping through the atmosphere will be aerated and purified before being deposited into the can or other receptacle.

By the use of my invention the milk may be very quickly cooled, and, as is well known, the quicker the animal heat is reduced the quicker more and better cream will be raised, thus furthering the best interests of the farmer and dairyman.

While I have illustrated and described the best means now known to me for carrying out my invention, I do not wish to be understood as limiting myself to the exact construction and arrangement shown and described, but hold that such slight changes and variations as might suggest themselves to the ordinary mechanic would properly fall within the limit and scope of my invention.

Having thus fully described my invention, what I claim as new, and desire to secure by Letters Patent, is—

A milk-strainer, comprising a bowl or receptacle for the milk, having its sides inclined downwardly toward the center, a pipe leading from the bottom thereof laterally and slightly downward, having its outer end closed and provided with perforations in its lower side extending throughout the length of the pipe, and a trough below the perforated pipe in the same vertical plane but inclined downward in the opposite direction to receive the milk passing through the perforations in the inclined pipe, substantially as described.

JOHN N. WRIGHT.

Witnesses:
C. E. McMILLAN,
D. KRIER.